United States Patent
Wei et al.

(10) Patent No.: US 9,048,755 B2
(45) Date of Patent: Jun. 2, 2015

(54) ADJUSTABLE SPEED DRIVE LIFETIME IMPROVEMENT SYSTEM

(71) Applicant: ROCKWELL AUTOMATION TECHNOLOGIES, INC., Mayfield Heights, OH (US)

(72) Inventors: Lixiang Wei, Whitefish Bay, WI (US); Richard A. Lukaszewski, New Berlin, WI (US); Russel J. Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/926,810

(22) Filed: Jun. 25, 2013

(65) Prior Publication Data

US 2013/0286702 A1 Oct. 31, 2013

Related U.S. Application Data

(62) Division of application No. 12/786,229, filed on May 24, 2010, now Pat. No. 8,471,516.

(51) Int. Cl.
*H02P 7/00* (2006.01)
*H02M 7/537* (2006.01)
*H02M 7/5387* (2007.01)
*H02P 9/00* (2006.01)
*H02P 27/08* (2006.01)

(52) U.S. Cl.
CPC .......... *H02M 7/537* (2013.01); *H02M 7/5387* (2013.01); *H02P 9/007* (2013.01); *H02P 27/08* (2013.01)

(58) Field of Classification Search
USPC .................. 318/140, 142, 147, 157; 290/4 B
See application file for complete search history.

(56) References Cited

U.S. PATENT DOCUMENTS 3,609,507 A * 9/1971 Beck .............................. 363/41
4,041,544 A 8/1977 Walden
(Continued)

FOREIGN PATENT DOCUMENTS

WO 2008150907 A1 12/2008

OTHER PUBLICATIONS

Lixiang Wei et al.; "Evaluation of Power Semiconductors Power Cycling Capabilities for Adjustable Speed Drive", Industry Applications Society Annual Meeting, 2008. Oct. 5, 2008, pp. 1-10.
(Continued)

*Primary Examiner* — Rina Duda
(74) *Attorney, Agent, or Firm* — Fletcher Yoder, P.C.

(57) ABSTRACT

The present techniques include methods and systems for operating an inverter to maintain a lifespan of the inverter. In some embodiments, the switching frequency and/or the output current of the inverter may be changed such that stress may be reduced on the inverter bond wires of the inverter. More specifically, embodiments involve calculating the aging parameters for certain operating conditions of the inverter and determining whether the operating conditions result in aging the inverter to a point which reduces the inverter lifespan below a desired lifespan. If the operating conditions reduce the inverter lifespan below the desired lifespan, the switching frequency may be reduced to a lower or minimum switching frequency of the inverter and/or the output current of the inverter may be reduced to a maximum output current at the minimum switching frequency.

19 Claims, 7 Drawing Sheets

(56) References Cited

U.S. PATENT DOCUMENTS

| | | | |
|---|---|---|---|
| 5,296,789 A * | 3/1994 | Ohi | 318/400.08 |
| 6,160,326 A | 12/2000 | Iversen et al. | |
| 6,233,396 B1 | 5/2001 | Kuwada et al. | |
| 6,465,978 B2 | 10/2002 | Takahashi | |
| 7,023,172 B2 * | 4/2006 | Katou | 318/807 |
| 7,356,441 B2 | 4/2008 | Kerkman et al. | |
| 7,904,254 B2 * | 3/2011 | Ibori et al. | 702/34 |
| 8,035,240 B2 * | 10/2011 | Erdman et al. | 290/44 |
| 8,159,178 B2 * | 4/2012 | Serban | 320/101 |
| 2005/0043910 A1 * | 2/2005 | Knebel et al. | 702/106 |
| 2005/0071090 A1 | 3/2005 | Katou | |
| 2007/0175681 A1 * | 8/2007 | King et al. | 180/65.4 |
| 2008/0262750 A1 * | 10/2008 | Ibori et al. | 702/34 |
| 2009/0008938 A1 * | 1/2009 | Erdman et al. | 290/44 |
| 2009/0009920 A1 * | 1/2009 | Yamada | 361/93.1 |
| 2009/0251831 A1 * | 10/2009 | Shiba et al. | 361/30 |

OTHER PUBLICATIONS

Extended European Search Report mailed Feb. 17, 2015.

* cited by examiner

ADJUSTABLE SPEED DRIVE LIFETIME IMPROVEMENT SYSTEM

CROSS-REFERENCE TO RELATED APPLICATIONS

This application is a divisional of Ser. No. 12/786,229, filed May 24, 2010, entitled "Adjustable Speed Drive Lifetime Improvement Method" in the name of Lixiang Wei et al.

BACKGROUND

The invention relates generally to the field of electrical power converters and inverters. More particularly, the invention relates to techniques for preventing or forestalling failure of motor drive circuitry due to overheating.

Power inverters and converters typically employ power modules to create a desired output current waveform, which is used to power various devices, such as motors and other equipment. The frequency and amplitude of the output current waveform may affect the operation of the device such as by changing the speed or torque of a motor, for example. Some power modules create the desired output current waveform through pulse width modulation, wherein power semiconductor switches such as insulated gate bipolar transistors (IGBTs) are caused to switch rapidly on and off in a particular sequence so as to create an approximately sinusoidal output current waveform. Furthermore, high transistor switching speeds tend to produce a smoother, more ideal sinusoidal waveform, which may be desirable in some applications. For example, in heating, ventilating, and air conditioning systems a smoother sinusoidal waveform will reduce system noise and vibrations.

Higher transistor switching speeds may tend, however, to increase the junction temperature of the transistors, which may result in more mechanical stress and increased rates of transistor failure over time. Attempts have been made to reduce transistor failure by limiting the maximum absolute transistor junction temperatures. However, these techniques have failed to account for the increased stresses that tend to occur under start-up conditions or low-speed conditions, wherein the transistors tend to experience high current at low output frequency.

It may be advantageous, therefore, to provide a system and method of reducing IGBT thermal stress that is particularly effective under start-up conditions and low-speed, high-current conditions. Specifically, it may be advantageous to provide a method of reducing temperature variations of the transistor junction, i.e. the semiconductor chip itself, and the case, i.e. the package in which the semiconductor chip is contained.

BRIEF DESCRIPTION

The present invention relates generally to a transistor protection mechanism configuration designed to address such needs. Embodiments include systems and methods of reducing the switching frequency and/or output current of an inverter module to avoid high junction temperature variation and stress on the bond wires. Embodiments also include methods of estimating the expected junction temperature variation.

DRAWINGS

These and other features, aspects, and advantages of the present invention will become better understood when the following detailed description is read with reference to the accompanying drawings in which like characters represent like parts throughout the drawings, wherein.

Figure 6:
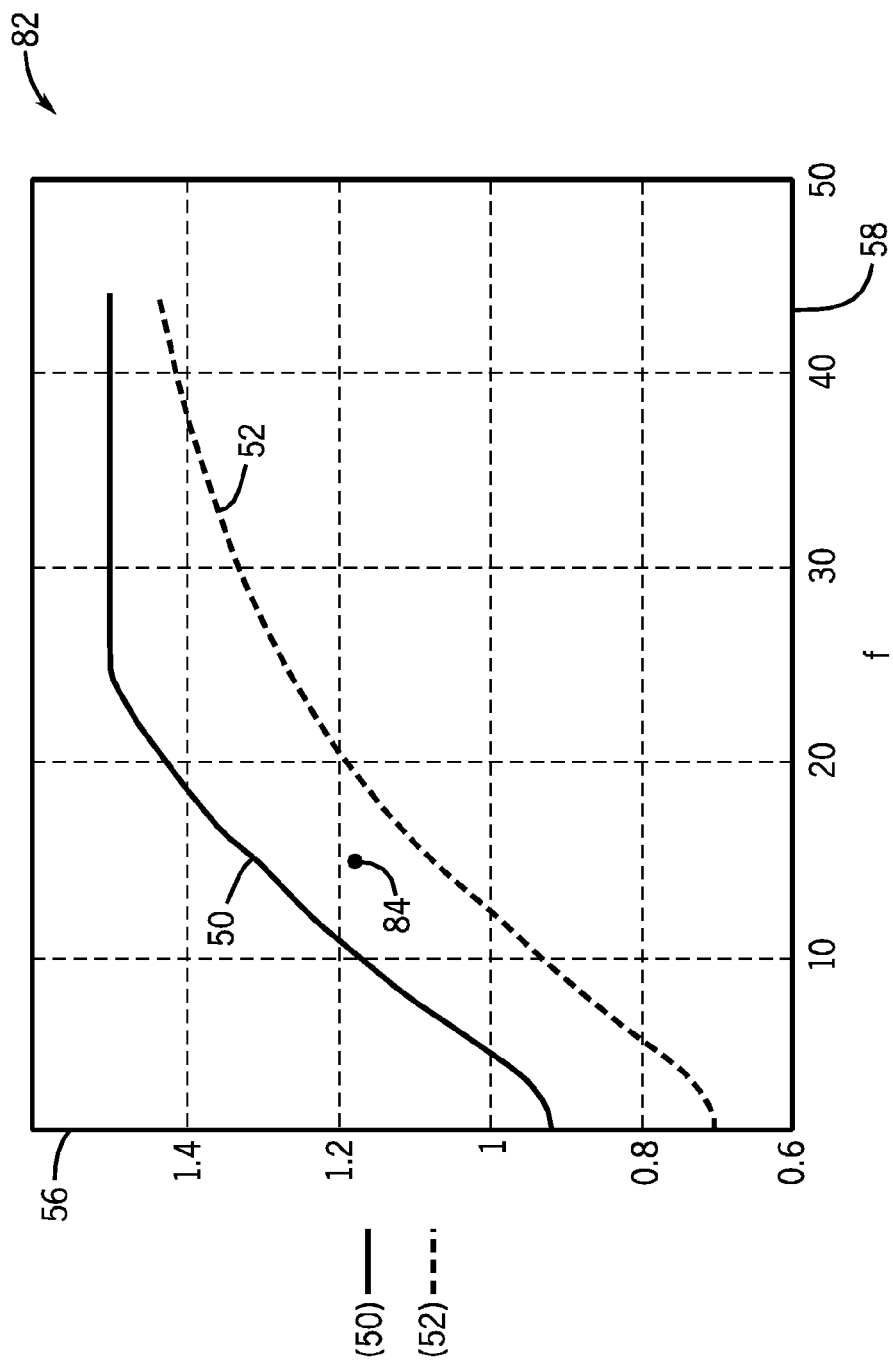
Figure 7:
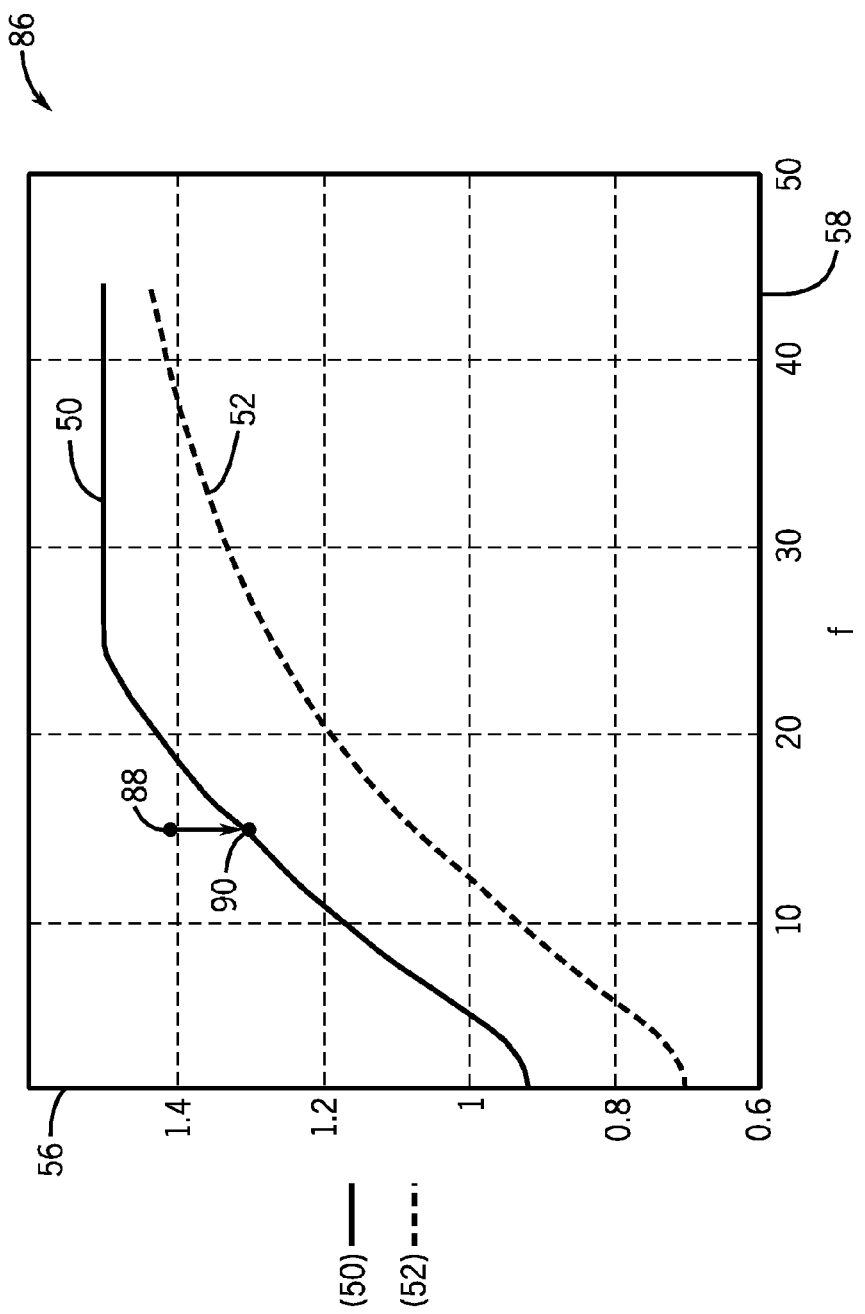

FIG. 6 is a plot representing an operating condition which may have a changed switching frequency to maintain or extend the lifespan of the inverter, in accordance with an embodiment of the present techniques; and FIG. 7 is a plot representing an operating condition which may have a changed switching frequency and/or output current to maintain a certain lifespan of the inverter, in accordance with an embodiment of the present techniques.

DETAILED DESCRIPTION

Embodiments of the present invention relate to reducing the mechanical stress on solid state switching devices, such as IGBTs due to large temperature variations of the junction. Large junction temperature variations may contribute to particularly high levels of mechanical stress, because the different expansion rates of the various materials inside the transistor package may lead to wire crack growth in wire bonds and similar contacts. Therefore, reducing junction temperature variations may result in a longer lasting inverter module. In embodiments of the present invention, the junction temperature variation is controlled by controlling the switching frequency. Because the highest junction temperature variations tend to occur during start-up or low-speed, high-current conditions, the switching frequency may be reduced for only a short time during start-up, after which the switching frequency may be increased to provide a smoother sinusoidal waveform.

Figure 1:
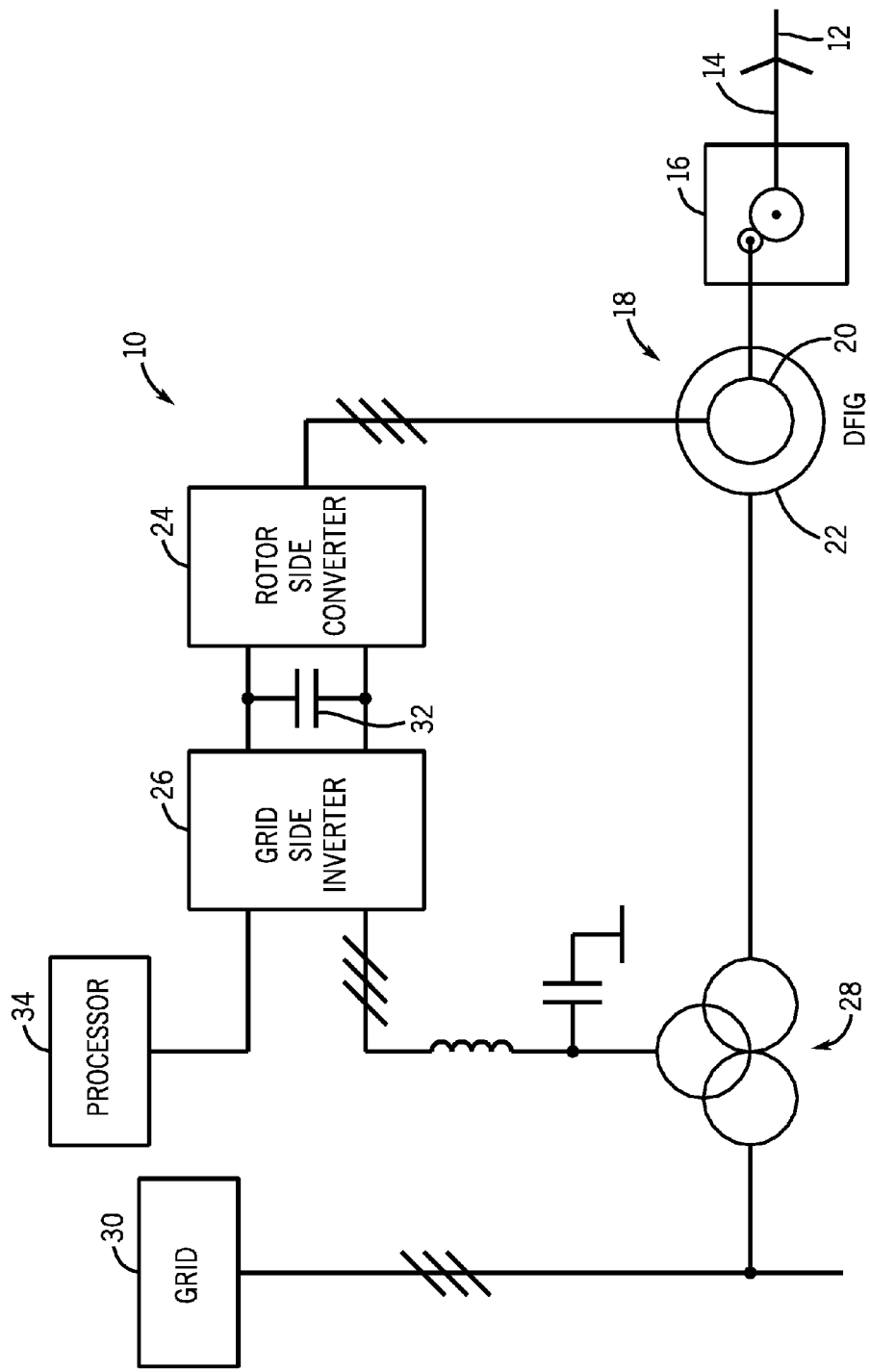
FIG. 1 is a block diagram of an exemplary application for a variable frequency drive, in the form of a wind power converter system which may include an adjustable speed inverter, in accordance with an embodiment of the present techniques.

Turning to the figures, FIG. 1 depicts an exemplary application in the form of a wind power system 10 which may include an adjustable speed inverter, in accordance with the present disclosure. It should be noted that a wind power system 10 is provided as one example for which present techniques of adjusting the speed of an inverter to forestall inverter failure may be implemented. In various embodiments, the present techniques may be implemented in any electronic system (not limited to a wind power system) having an inverter module.

Referring again to the example provided in FIG. 1, the wind power system 10 may be suitable for capturing power from wind using turbine blades 12 and converting the captured wind power into mechanical power, and the mechanical power into electrical power. The system 10 may include a gearbox 16 connected to the turbine rotor 14 of the turbine blades 12. The gearbox 16 may adapt the relatively low speed of the turbine rotor 14 with the relatively high speed of a generator 18.

The generator 18 may convert the mechanical power into electrical power, and may be, for example, an induction generator or a synchronous generator. For example, the generator 18 illustrated in FIG. 1 may be a doubly fed induction generator (DFIG), which includes a rotor winding 20 and a stator winding 22. The stator winding 22 of the generator 18 may be connected to a transformer 28 which transfers electrical power through inductively coupled conductors to a suitable voltage level for an electrical grid 30. The grid 30 may be an interconnected network which delivers electrical power to various other electrical devices or networks. The rotor winding 20 of the generator 18 may be connected to the grid 30 by the converter 24 and inverter 26 which decouple mechanical and electrical frequencies (e.g., to enable variable-speed operation).

The system 10 may include a converter and inverter module including a three-phase AC-DC converter 24 and a three-phase DC-AC inverter 26. The converter 24 and inverter 26 may be linked by a DC capacitor battery 32. The converter 24 may be connected to the rotor winding 20 of the generator 18, and may also be referred to as the rotor side converter 24. The inverter 26 may be connected to the grid 30 by the transformer 28, and may also be referred to as the grid side inverter 26. The bidirectional converter and inverter 24 and 26 may enable vector control of the active and reactive powers delivered to the grid 30 and may also increase power quality and angular stability and decrease the harmonic content introduced into the grid 30 (e.g., via filters).

The converter 24 and inverter 26 may be used for varying levels of power control, and may sometimes output relatively high power (voltage and current). The converter 24 and inverter 26 may include transistors and antiparallel diodes for switching and converting such voltages. In some embodiments, the system 10 may include one or more processors 34 for controlling an operation of the inverter 26. For example, and as will be discussed, the processor 34 may change the switching frequency or output current of transistors in the inverter 26 to decrease power loss and junction temperature variations which may be affected by the operations of the transistors in the inverter. The processor 34 may further be suitable for executing algorithms and computing parameters associated with operations of the inverter.

Figure 2:
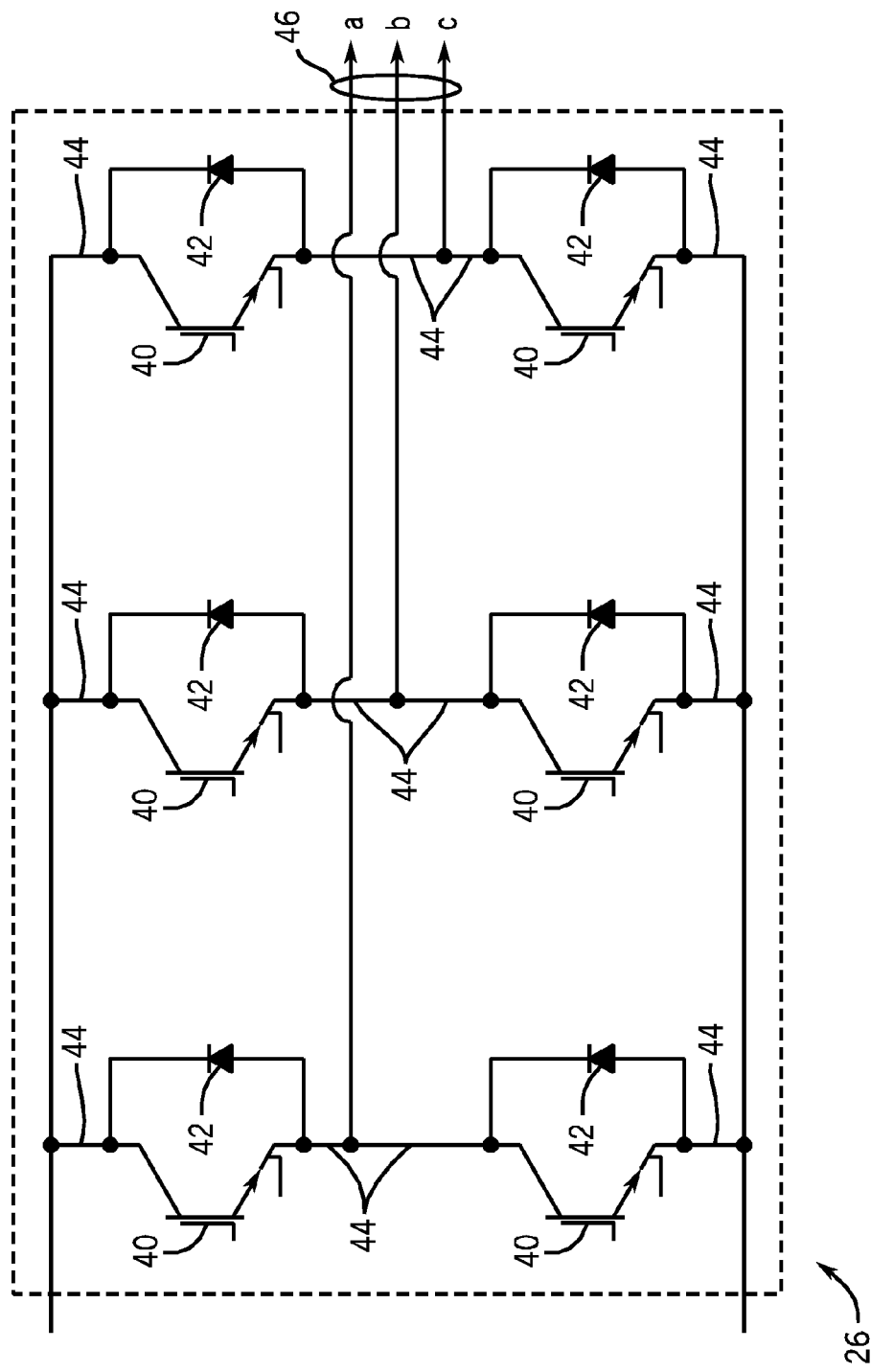
FIG. 2 illustrates a schematic diagram of an inverter in the exemplary application of FIG. 1, in accordance with an embodiment of the present techniques.
Figure 3:
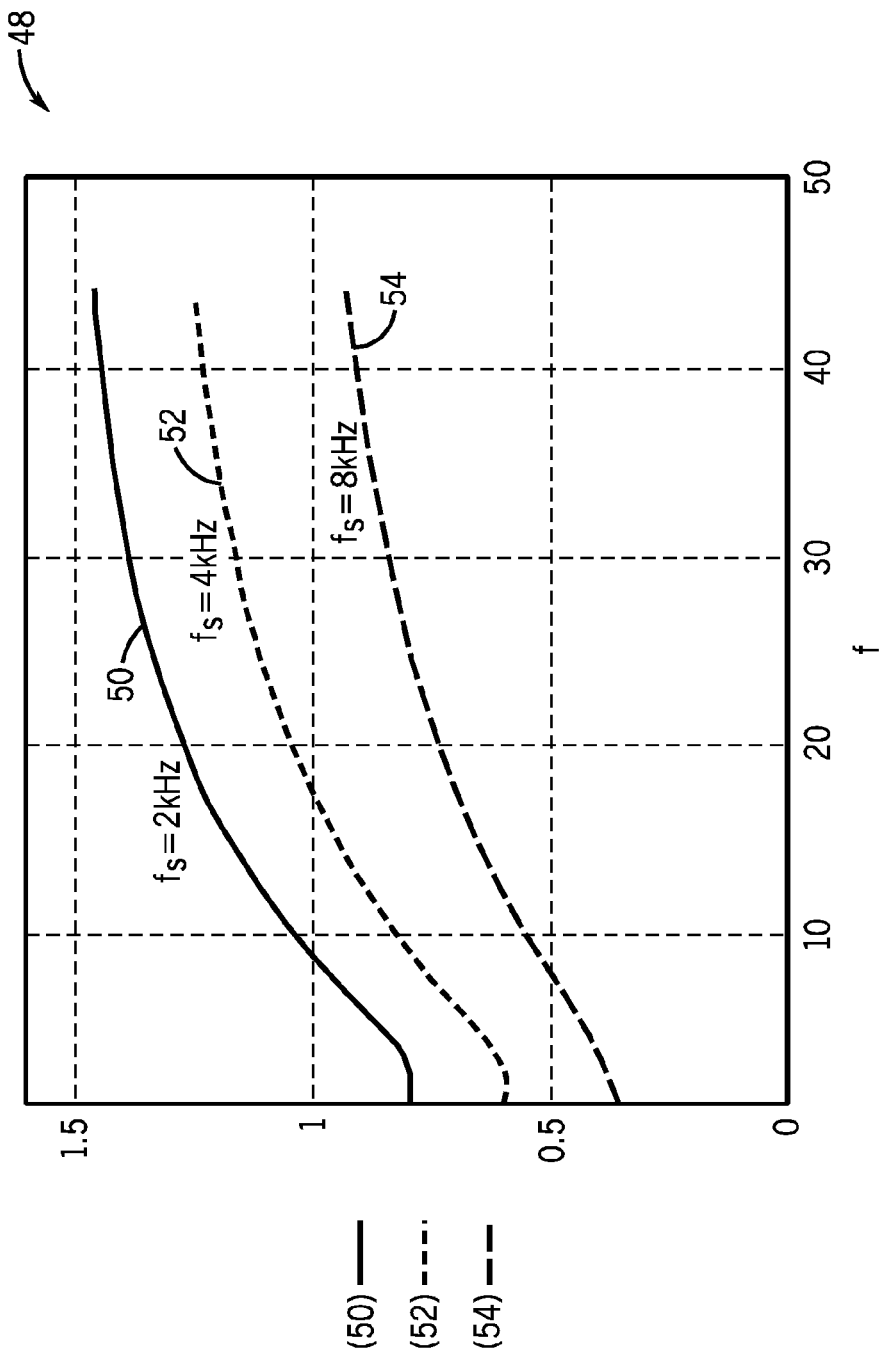
FIG. 3 is a plot representing the relationship between output current and operating frequency for different switching frequencies, while maintaining a certain lifespan of an inverter, in accordance with an embodiment of the present techniques.

One example of an inverter 26 in some embodiments is provided in FIG. 2. The inverter 26 may include a plurality of insulated gate bipolar transistors (IGBTs) 40 and power diodes 42, each diode 42 configured antiparallel to a respective IGBT 40. The IGBTs 40 and power diodes 42 are joined to positive or negative DC lines (as appropriate) and output lines a, b, or c with bond wires 44. For example, the output lines a, b, and c of the output 46 may output the three-phase voltages $v_a$, $v_b$, and $v_c$. The rapid on and off switching of the IGBTs 40 to produce a discretized three-phase output current waveform at the output 46 may result in conduction losses and switching losses, which may result in a higher junction temperature at the IGBTs 40. Such junction temperatures may result in strain and/or deformation of the bond wires 44, which may shorten the lifespan of the inverter 26. Though the example of an inverter 26 provided in FIG. 2 relates generally to an inverter of a wind power system 10, the present embodiments may apply to any inverter module having switching transistors, as high junction temperatures may strain and/or deform the transistors and/or bond wires of a typical inverter. As used herein, an inverter 26 may refer to any inverter module in an electronic system, and the IGBTs 40 may refer to any type of switching transistor (and is not limited to an IGBT).

Accordingly, embodiments of the present invention include a method of estimating the peak junction temperature in an inverter module. In some embodiments, the estimated peak junction temperature may be based on the estimated power losses of the IGBTs 40. Furthermore, the estimated power losses of the IGBT 40 may be based on estimated operating conditions of the IGBTs 40. For example, peak IGBT 40 junction temperature estimates may be based on estimated conduction losses and switching losses as calculated according to the following equations:

$$P_c(f, I_{RMS}) = \left(\frac{1}{2\cdot\pi} + \frac{M(f)\cdot PF}{8}\right)\cdot V_t \cdot \sqrt{2} \cdot I_{RMS} + \left(\frac{1}{8} + \frac{M(f)\cdot PF}{3\cdot\pi}\right)\cdot R_t \cdot 2 \cdot I_{RMS}^2, \quad (1)$$

$$P_s(f_s, I_{RMS}) = \frac{1}{\pi}\cdot f_s \cdot E_{onoff} \cdot \left(\frac{\sqrt{2}\cdot I_{RMS}}{I_{nom}}\right)\cdot\left(\frac{V_{DC}}{V_{nom}}\right), \text{ and} \quad (2)$$

$$P(f, f_s, I_{RMS}) = P_c(f, I_{RMS}) + P_s(f_s, I_{RMS}), \quad (3)$$

where $P_c$ is the estimated conduction power loss as a function of the fundamental frequency, f, and the output RMS current of the drive, $I_{RMS}$, $P_s$ is the estimated switching power losses as a function of the switching frequency, $f_s$, and the output RMS current of the drive, $I_{RMS}$, and $P(f, f_s, I_{RMS})$ equals the total estimated power losses of the IGBT 40. In equation (1), M(f) represents the modulation index and PF represents the power factor of a load driven by the inverter 26. In equation (1), $V_t$ represents the approximate IGBT 40 conduction voltage at small or near zero forward current and $R_t$ represents the approximate slope resistance. Both $V_t$ and $R_t$ may be derived from a manufacturer datasheet for the transistor (e.g., IGBT 40) used in the inverter 26. In equation (2), $E_{onoff}$ represents the total energy required to switch the IGBT 40 on and off at a rated voltage $V_{nom}$ (half of the IGBT rated voltage) and current $I_{nom}$ (rated IGBT module current) of the IGBT 40. All three of $E_{onoff}$, $V_{nom}$, and $I_{nom}$ may be obtained from manufacturer data sheets. $I_{RMS}$ and $V_{AC}$ represent the estimated output current and bus voltage of the IGBT 40.

Therefore, both the output current $I_{RMS}$ and the switching frequency $f_s$ act as scaling factors applied to the switching loss value which contribute to the total power loss P. The total power loss P may affect the junction temperature variation ($\Delta T_j$), which decreases the lifespan of the inverter 26. For example, the total power loss P may be used to calculate the junction temperature variation $\Delta T_j$ using the equations described below.

In some embodiments, the calculation of the junction temperature variation, $\Delta T_j$, may be approximated by assuming that the temperature variation of the case is negligible. As such, a "boost factor" (BF(f)) may be first calculated according to the following equation:

$$BF(f) = 1 + \sum_{i=1}^{4}\frac{R_i}{R_{jc}}\cdot\frac{\pi - 1}{\sqrt{1+(2\pi\cdot f\cdot\tau_i)^2}}, \quad (4)$$

where $R_i$ and $\tau_i$ equal the thermal resistances and capacitances of the thermal network of the inverter 26, and $R_{jc}$ equals the overall thermal resistance between the junction and the case.

Furthermore, an interim value, $BF\_\Delta T_j$, may be approximated from the boost factor, according to the following equations:

$$BF\_\Delta T_j(f) = 1.85 \cdot (BF(f) - 1) \text{ if } BF(f) < 2 \quad (5);$$

$$BF\_\Delta T_j(f) = BF(f) \text{ if } BF(f) \geq 2 \quad (6).$$

Having obtained the estimated power losses and the boost factor, the estimated junction temperature variation, $\Delta T_j$, may then be approximated according to the following formula:

$$\Delta T_j(f, f_s, I_{rms}) = PI(f, f_s, I_{rms}) \cdot BF\_\Delta T_j(f) \cdot R_j \quad (7),$$

where $\Delta T_j$ represents the junction temperature variation after one output cycle of the inverter module.

It will be appreciated that variations of the above formulas may be made while still falling within the scope of the present invention. Additionally, in some embodiments one or more of the variables, such as $I_{RMS}$, $E_{onoff}$ or $V_{DC}$ for example, may be measured. Alternatively, these variables may also be estimated based on average known operating conditions of typical inverter modules or a particular inverter module. Additionally, in some embodiments, the diode 42 junction temperature variation may be estimated rather than the IGBT 40 junction temperature variation.

The mean junction temperature $T_m$ can be calculated using a negative temperature coefficient (NTC) sensor. Generally, the NTC temperature sensor is embedded inside or on a heatsink near the IGBT module. When the NTC temperature sensor is embedded near the IGBTs 40, the average junction temperature of the IGBTs 40 can be approximated by the following equations $$T_m = T_{ntc} + PI \cdot \sum_{i=1}^{4} \frac{R_i}{1 + sR_iC_i} + PI \cdot \frac{R_{ii}}{1 + sR_{ii}C_{ii}} + PI \cdot \frac{R_{di}}{1 + sR_{di}C_{di}}, \quad (8)$$

where $R_i$ and $C_i$ represents the thermal resistance an capacitance, respectively. $R_{ii}$ and $C_{ii}$ represent the thermal couple resistance and thermal couple capacitance, respectively, between IGBT power and temperature difference between the IGBT case layer and the NTC sensor. $R_{di}$ and $C_{di}$ represent the thermal couple resistance and capacitance between diode power and temperature difference between IGBT base layer and the NTC sensor. $T_{ntc}$ represents the temperature of the drive measured by the NTC sensor. The parameters $R_{ii}$, $C_{ii}$, $R_{di}$ and $C_{di}$ can be extracted parameters from the inverter 26.

In some embodiments, the number of cycles to failure ($N_f$) for the IGBT can be estimated using different algorithms. For instance, one example of how the number of cycles to failure is estimated is provided in U.S. Patent Application Number 20090276165. In other embodiments, different methods may also be used to estimate the number of cycles to failure, and may be based on the parameters of the inverter and/or electronic system.

Figure 4:
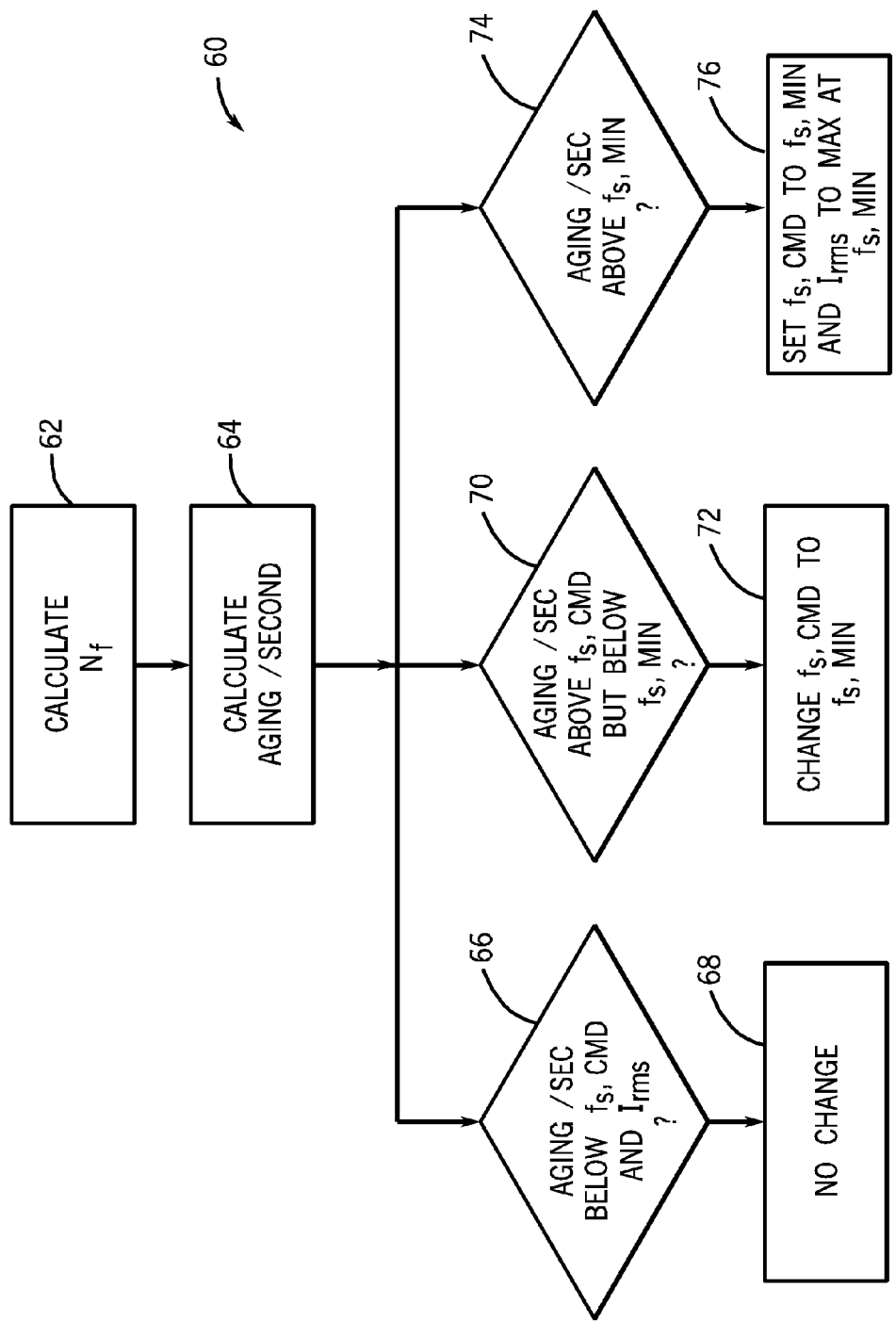
FIG. 4 is a flow chart summarizing a process for changing a switching frequency and/or an output current to operate an inverter such that a certain lifespan of the inverter may be maintained, in accordance with an embodiment of the present techniques.

One or more embodiments include techniques for adjusting the switching frequency and/or output current of an IGBT 40 to possibly increase the lifespan of an inverter 26. For example, one technique may be represented by the flow chart of the process 60 in FIG. 4. The process may begin by calculating (block 62) the number of cycles to failure, based on the previously discussed equations. The aging per second of the inverter 26 may then be calculated (block 64) based on the calculated number of cycles to failure. For example, the aging speed of the drive can be calculated by the following equation:

$$\text{Aging\_per\_second} = 1/N_f(\Delta T_j, T_{jmin})/f \quad (9).$$

In some embodiments, the aging per second of the IGBT 40 can be further characterized as a function of the switching frequency: $f_s$, drive operating frequency: $f$ and output current $I_o$.

The switching frequency ($f_s$) and/or the output current ($I_{RMS}$) may be changed based on the calculated aging per second (equation (9)) of the IGBTs 40 in the inverter 26. In some embodiments, the processor 34, or any other suitable processor of the wind power system 10 may perform algorithms to calculate the number of cycles to failure and/or the aging per second of the inverter 26. The processor 34 may also be used to control the operation (e.g., altering an IGBT 40 switching frequency or output current) of the inverter 26 based on the calculated results.

Figure 5:
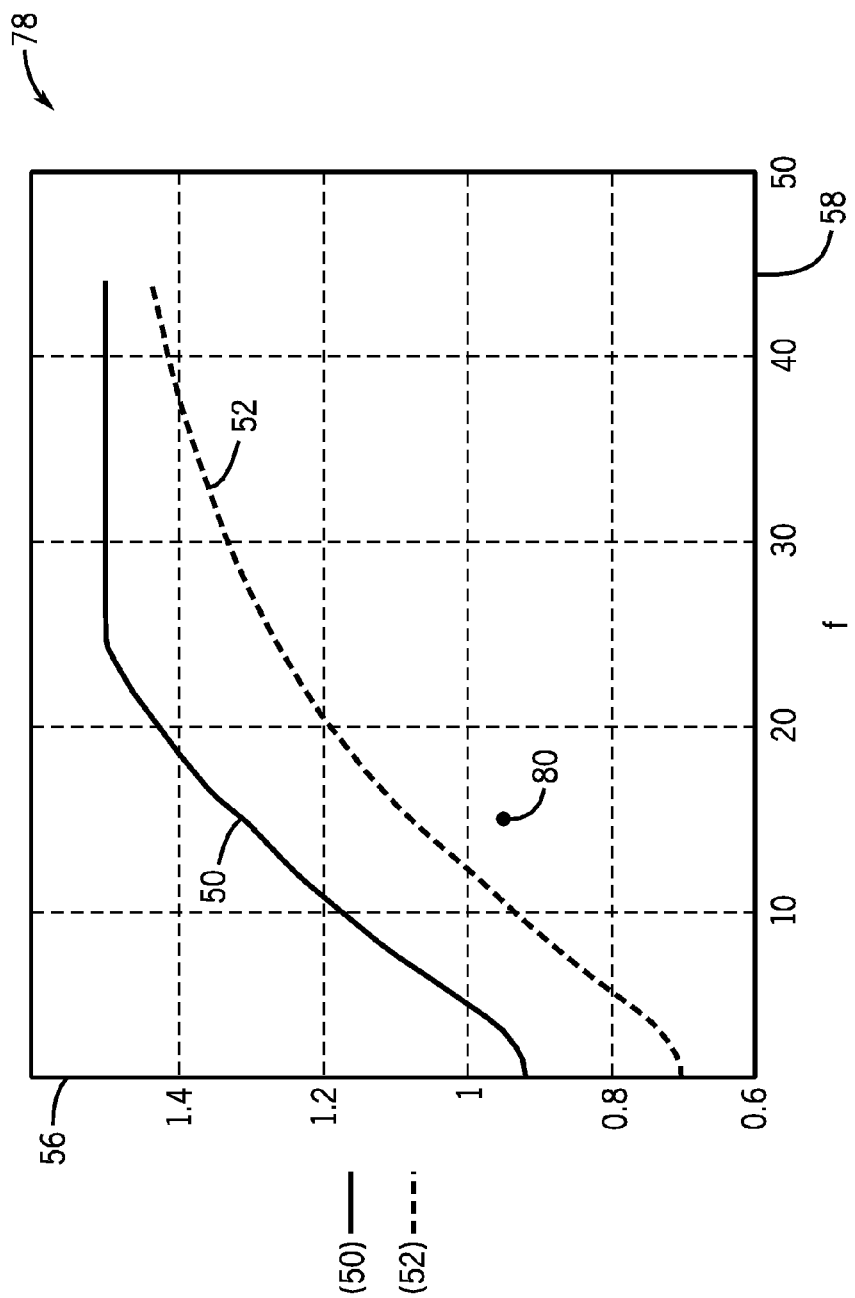
FIG. 5 is a plot representing an operating condition which maintains or extends the lifespan of the inverter, in accordance with an embodiment of the present techniques.

In some embodiments, the calculated aging per second of the inverter 26 may be characterized by three scenarios, which are represented in FIGS. 5, 6, and 7 as plots 78, 82, and 86, respectively. Referring again to FIG. 4, the process 60 may involve determining (block 66) whether the aging per second is below the commanded switching frequency ($f_{s,cmd}$) of the IGBTs 40 and the maximum operating current ($I_{RMS}$) at the commanded switching frequency $f_{s,cmd}$. For example, referring to the plot 78 of FIG. 5, if the commanded switching frequency $f_{s,cmd}$ were 4 kHz, represented by the trace 52, the aging per second at the commanded parameters, represented by point 80, may not increase the aging rate of the inverter 26 beyond the desired lifespan of the inverter 26. Thus, referring to FIG. 4, no change may be made (block 68) to the operation of the inverter 26.

However, referring to the plot 82 of FIG. 6, if the commanded switching frequency $f_{s,cmd}$ were 4 kHz, represented by the trace 52, the aging per second at the commanded parameters, represented by point 84, may be above the maximum current 56 at the commanded switching frequency, which may result in increased power loss, increased junction temperature variation, increased inverter aging, and decreased inverter lifespan. In some embodiments, the process 60 (FIG. 4) may involve determining (block 70) whether the calculated aging per second of the commanded parameters is above the currently commanded switching frequency $f_{s,cmd}$, but lower than a minimum switching frequency ($f_{s,min}$) of the inverter 26. The process may then change (block 72) the commanded switching frequency $f_{s,cmd}$ to a lower switching frequency. For example, the commanded switching frequency $f_{s,cmd}$ may be changed (block 72) to the minimum switching frequency $f_{s,min}$ of the inverter (e.g., 2 kHz), as represented by the trace 50. By setting the $f_{s,cmd}$ to a lower frequency $f_{s,min}$, the operating parameters of the point 84 may be within the operating range of the inverter 26 for achieving a desired lifespan of the inverter 26.

Referring to the plot 86 of FIG. 7, if the commanded switching frequency $f_{s,cmd}$ were 2 kHz, represented by the trace 50, the aging per second at the commanded parameters, represented by point 88, may be above the maximum current 56 at the commanded switching frequency. Further, as the commanded switching frequency $f_{s,cmd}$ may already be the minimum switching frequency $f_{s,min}$ of the inverter 26, the lowering the switching frequency may not be possible for improving the aging per second of the operating parameters. Thus, in some embodiments, both the switching frequency $f_s$ and the output current $I_{RMS}$ may be changed. For example, the process 60 (FIG. 4) may involve determining (block 74) whether the calculated aging per second of the commanded parameters is above the currently commanded switching frequency $f_{s,cmd}$, and also above a minimum switching frequency ($f_{s,min}$) of the inverter 26. The process 60 may then change (block 74) the output current command $I_{RMS}$ to the maximum output current under the minimum switching frequency $f_{s,min}$, as represented by the adjustment of point 88 to point 90. In some embodiments, if the commanded switching frequency $f_{s,cmd}$ is not already at the minimum switching frequency $f_{s,min}$, the commanded switching frequency $f_{s,cmd}$ may also be set to the minimum switching frequency $f_{s,min}$. Therefore, the operating parameters of the point 90 may be within the operating range of the inverter 26 for achieving a desired lifespan of the inverter 26.

In some embodiments, the process 60 may be performed dynamically or performed at intervals. For example, the process 60 may be performed at set time intervals, or the process 60 may be performed whenever operating changes in the system 10 occur. By continuously applying the process 60, an appropriate switching frequency and/or output current may be selected for the IGBTs 40 of the inverter 26 to maintain a desired lifespan of the inverter 26.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
 a generator;
 a converter coupled to the generator;
 an inverter coupled to the converter, wherein the inverter comprises a plurality of transistors; and
 a processor coupled to the inverter, wherein the processor is configured to calculate a failure parameter of the inverter and to adjust a command switching frequency of the plurality of transistors and an output current of the plurality of transistors in a closed loop manner based on the failure parameter of the inverter;
 wherein the processor is configured to compare the failure parameter with a threshold parameter and configured to lower the command switching frequency if the failure parameter is above the threshold parameter.

2. The system of claim 1, wherein the generator is a doubly-fed induction generator (DFIG).

3. The system of claim 1, wherein the plurality of transistors comprises a plurality of insulated gate bipolar transistors (IGBTs).

4. The system of claim 3, wherein the plurality of transistors comprises a plurality of diodes configured antiparallel to the plurality of IGBTs.

5. The system of claim 1, wherein the processor is configured to calculate a number of cycles to failure of the inverter and an aging per second of an operating parameter of the inverter to calculate the failure parameter of the inverter.

6. The system of claim 1, wherein the processor is configured to compare the command switching frequency with a minimum switching frequency and lower the output current to a maximum output current of the minimum switching frequency, if the command switching frequency is approximately the same as the minimum switching frequency.

7. A system, comprising:
 a generator;
 a converter coupled to the generator;
 an inverter coupled to the converter, wherein the inverter comprises a plurality of transistors; and
 a processor coupled to the inverter, wherein the processor is configured to calculate a failure parameter of the inverter, to change a command switching frequency of the plurality of transistors to a lower switching frequency if the failure parameter is above a first threshold parameter, and to change an output current of the plurality of transistors if the failure parameter is above the first threshold parameter and if the lower switching frequency is at a minimum switching frequency of the inverter.

8. The system of claim 7, wherein the processor is configured to calculate a number of cycles of the inverter to an estimated failure of the inverter to calculate the failure parameter of the inverter.

9. The system of claim 7, wherein the plurality of transistors output current at a first current level, and wherein the processor is configured to calculate the failure parameter of the inverter based on the first current level and the command switching frequency.

10. The system of claim 7, wherein the processor is configured to calculate a junction temperature variation of bond wires in the inverter to calculate the failure parameter of the inverter.

11. The system of claim 7, wherein the processor is configured to calculate a fatigue function of the inverter to calculate the failure parameter of the inverter.

12. The system of claim 7, wherein the first threshold parameter is based on the commanded switching frequency and a maximum output current of the inverter with respect to an operating frequency of the parameter.

13. The system of claim 7, wherein the plurality of transistors comprises a plurality of insulated gate bipolar transistors (IGBTs).

14. A system, comprising:
 a converter;
 an inverter coupled to the converter, wherein the inverter comprises a plurality of transistors; and
 a processor coupled to the inverter, wherein the processor is configured to calculate a failure parameter of the inverter, to change a command switching frequency of the plurality of transistors to a different switching frequency if the failure parameter is above a first threshold parameter, and to change an output current of the plurality of transistors if the failure parameter is above the first threshold parameter and if the switching frequency is at a second threshold parameter of the inverter.

15. The system of claim 14, wherein the second threshold parameter is the minimum switching frequency of the inverter.

16. The system of claim 14, wherein the first threshold parameter is based on the commanded switching frequency and an output current value of the inverter with respect to an operating frequency of the parameter.

17. The system of claim 14, wherein the processor is configured to calculate a number of cycles to failure of the inverter and an aging per second of an operating parameter of the inverter to calculate the failure parameter of the inverter.

18. The system of claim 14, wherein the processor is configured to calculate a junction temperature variation of bond wires in the inverter to calculate the failure parameter of the inverter.

19. The system of claim 18, wherein the processor is configured to calculate the junction temperature variation based on estimated conduction power losses and estimated switching power losses.

* * * * *